United States Patent
Park et al.

(10) Patent No.: US 7,280,180 B2
(45) Date of Patent: Oct. 9, 2007

(54) LIQUID CRYSTAL DISPLAY PANEL WITH FIRST AND SECOND DUMMY UV SEALANTS AND METHOD FOR FABRICATING THE SAME

(75) Inventors: Moo Yeol Park, Taegu-kwangyokshi (KR); Sung Su Jung, Taegu-kwangyokshi (KR)

(73) Assignee: LG.Philips LCD Co., Ltd., Seoul (KR)

(*) Notice: Subject to any disclaimer, the term of this patent is extended or adjusted under 35 U.S.C. 154(b) by 0 days.

(21) Appl. No.: 11/057,148

(22) Filed: Feb. 15, 2005

(65) Prior Publication Data

US 2005/0134786 A1 Jun. 23, 2005

Related U.S. Application Data

(62) Division of application No. 10/125,520, filed on Apr. 19, 2002.

(30) Foreign Application Priority Data

Mar. 19, 2002 (KR) .................. 10-2002-014657

(51) Int. Cl.
  *G02F 1/1339* (2006.01)
(52) U.S. Cl. ...................... 349/190; 349/153
(58) Field of Classification Search .............. 349/190, 349/153
  See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,766,493 A * | 6/1998 | Shin ........................ 216/23 |
| 5,852,484 A | 12/1998 | Inoue et al. | |

(Continued)

FOREIGN PATENT DOCUMENTS

EP    1 003 066    5/2000

(Continued)

*Primary Examiner*—David Nelms
*Assistant Examiner*—Richard H Kim
(74) *Attorney, Agent, or Firm*—McKenna, Long & Aldridge, LLP

(57) ABSTRACT

The present invention discloses a liquid crystal display panel and a method for fabricating the same including a main UV sealant on a substrate, a first dummy UV sealant outside the main UV sealant, and a second dummy UV sealant outside the first dummy UV sealant.

10 Claims, 11 Drawing Sheets

U.S. PATENT DOCUMENTS

| | | | |
|---|---|---|---|
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfield et al. | |
| 6,163,357 A | 12/2000 | Nakamura | |
| 6,219,126 B1 | 4/2001 | Von Gutfeld | |
| 6,222,603 B1 * | 4/2001 | Sakai et al. | 349/153 |
| 6,226,067 B1 | 5/2001 | Nishiguchi et al. | |
| 6,236,445 B1 | 5/2001 | Foschaar et al. | |
| 6,239,855 B1 | 5/2001 | Nakahara et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,567,147 B1 | 5/2003 | Hirakata | |
| 6,573,972 B2 * | 6/2003 | Sasaki | 349/190 |
| 2001/0021000 A1 | 9/2001 | Egami | |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-5722 | 4/1984 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-054225 | 3/1987 |
| JP | 62-054228 | 3/1987 |
| JP | 62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 03-009549 | 1/1991 |
| JP | 05-03425 | 2/1993 |
| JP | 05-036426 | 2/1993 |
| JP | 05-107533 | 4/1993 |
| JP | 5-127179 | 5/1993 |
| JP | 5-154923 | 6/1993 |
| JP | 5-188387 | 7/1993 |
| JP | 5-265011 | 10/1993 |
| JP | 5-281557 | 10/1993 |
| JP | 5-281562 | 10/1993 |
| JP | 06-018829 | 1/1994 |
| JP | 6-51256 | 2/1994 |
| JP | 06-064229 | 3/1994 |
| JP | 6-148657 | 5/1994 |
| JP | 6-160871 | 6/1994 |
| JP | 06-194637 | 7/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 07-275770 | 10/1995 |
| JP | 07-275771 | 10/1995 |
| JP | 08-076133 | 3/1996 |
| JP | 8-95066 | 4/1996 |
| JP | 8-101395 | 4/1996 |
| JP | 8-106101 | 4/1996 |
| JP | 08-110504 | 4/1996 |
| JP | 08-136937 | 5/1996 |
| JP | 8-171094 | 7/1996 |
| JP | 08-173874 | 7/1996 |
| JP | 8-190099 | 7/1996 |
| JP | 8-240807 | 9/1996 |
| JP | 09-001026 | 1/1997 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-115833 | 5/1998 |
| JP | 10-123537 | 5/1998 |
| JP | 10-123538 | 5/1998 |
| JP | 10-142616 | 5/1998 |
| JP | 10-174924 | 6/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-133442 | 5/1999 |
| JP | 11-142864 | 5/1999 |
| JP | 11-160719 | 6/1999 |
| JP | 11-174477 | 7/1999 |
| JP | 11-212045 | 8/1999 |
| JP | 11-248930 | 9/1999 |
| JP | 11-262712 | 9/1999 |
| JP | 11-264991 | 9/1999 |
| JP | 11-281988 | 10/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 8/2000 |
| JP | 2000-241821 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |

| | | | | | |
|---|---|---|---|---|---|
| JP | 2001-133794 | 5/2001 | JP | 2002-122870 | 4/2002 |
| JP | 2001-133799 | 5/2001 | JP | 2002-122872 | 4/2002 |
| JP | 2001-142074 | 5/2001 | JP | 2002-122873 | 4/2002 |
| JP | 2001-147437 | 5/2001 | JP | 2002-0034881 | 5/2002 |
| JP | 2001-154211 | 6/2001 | JP | 2002-131762 | 5/2002 |
| JP | 2001-166272 | 6/2001 | JP | 2002-139734 | 5/2002 |
| JP | 2001-166310 | 6/2001 | JP | 2002-156518 | 5/2002 |
| JP | 2001-183683 | 7/2001 | JP | 2002-169166 | 6/2002 |
| JP | 2001-201750 | 7/2001 | JP | 2002-169167 | 6/2002 |
| JP | 2001-209052 | 8/2001 | JP | 2002-182222 | 6/2002 |
| JP | 2001-209056 | 8/2001 | JP | 2002-202512 | 7/2002 |
| JP | 2001-209057 | 8/2001 | JP | 2002-202514 | 7/2002 |
| JP | 2001-209058 | 8/2001 | JP | 2002-214626 | 7/2002 |
| JP | 2001-209060 | 8/2001 | JP | 200-236292 | 8/2002 |
| JP | 2001-215459 | 8/2001 | JP | 2002-229042 | 8/2002 |
| JP | 2001-222016 | 8/2001 | JP | 2002-236276 | 8/2002 |
| JP | 2001-222017 | 8/2001 | JP | 2002-258299 | 9/2002 |
| JP | 2001-235758 | 8/2001 | JP | 2002-277865 | 9/2002 |
| JP | 2001-255542 | 9/2001 | JP | 2002-277866 | 9/2002 |
| JP | 2001-264782 | 9/2001 | JP | 2002-287156 | 10/2002 |
| JP | 2001-272640 | 10/2001 | JP | 2002-296605 | 10/2002 |
| JP | 2001-281675 | 10/2001 | JP | 2002-311438 | 10/2002 |
| JP | 2001-281678 | 10/2001 | JP | 2002-311440 | 10/2002 |
| JP | 2001-282126 | 10/2001 | JP | 2002-311442 | 10/2002 |
| JP | 2001-305563 | 10/2001 | JP | 2002-41355 | 11/2002 |
| JP | 2001-330837 | 11/2001 | JP | 2002-323687 | 11/2002 |
| JP | 2001-330840 | 11/2001 | JP | 2002-323694 | 11/2002 |
| JP | 2001-337335 | 12/2001 | JP | 2002-333628 | 11/2002 |
| JP | 2001-356353 | 12/2001 | JP | 2002-333635 | 11/2002 |
| JP | 2001-356354 | 12/2001 | JP | 2002-333843 | 11/2002 |
| JP | 2002-14360 | 1/2002 | JP | 2002-341329 | 11/2002 |
| JP | 2002-23176 | 1/2002 | JP | 2002-341356 | 11/2002 |
| JP | 2002-49045 | 2/2002 | JP | 2002-341358 | 11/2002 |
| JP | 2002-079160 | 3/2002 | JP | 2002-341359 | 11/2002 |
| JP | 2002-080321 | 3/2002 | JP | 2002-341362 | 11/2002 |
| JP | 2002-82340 | 3/2002 | JP | 2002-3411357 | 11/2002 |
| JP | 2002-90759 | 3/2002 | KR | 2000-00352302 | 6/2000 |
| JP | 2002-90760 | 3/2002 | | | |
| JP | 2002-107740 | 4/2002 | | | |

\* cited by examiner

LIQUID CRYSTAL DISPLAY PANEL WITH FIRST AND SECOND DUMMY UV SEALANTS AND METHOD FOR FABRICATING THE SAME

This application is a Divisional of U.S. patent application No. 10/125,520 filed Apr. 19, 2002 and claims the benefit of the Korean patent Application No. P2002-14657 filed in Korea on Mar. 19, 2002, both of which are hereby incorporated by reference in their entirety.

BACKGROUND OF THE INVENTION

1. Field of the Invention

The present invention relates to a liquid crystal display (LCD), and more particularly, to a liquid crystal display panel and a method for fabricating the same by a liquid crystal dropping method.

2. Discussion of the Related Art

A thin flat panel display tends to have a thickness of no more than a few centimeters. Particularly, a liquid crystal display (LCD) has a wide scope of applications, such as notebook computers, computer monitors, gauge monitors for space crafts and air crafts, and the like.

In general, the LCD is provided with a lower substrate having thin film transistors and pixel electrodes formed thereon, an upper substrate opposite to the lower substrate having a black matrix (BM), a color filter layer, and a common electrode, which are formed thereon, and a liquid crystal layer between the two substrates, for driving the liquid crystal by the electric field generated by the power supply applied to the pixel electrodes and the common electrode between the substrates, to regulate the transmittivity of the liquid crystal, thereby displaying a picture on the display screen.

In the foregoing LCD, a vacuum injection method has been used for forming the liquid crystal layer between the lower substrate and the upper substrate. In such a method, after the lower substrate and the upper substrate are attached to each other, a liquid crystal is injected between the two substrates by using capillary phenomenon and a pressure difference. However, the vacuum injection method takes much time to inject the liquid crystal between the substrates. As a result, productivity is much reduced as the substrate becomes large.

Consequently, a method called a liquid crystal dropping method is suggested for solving such a problem. A method for fabricating an LCD panel by using a related art liquid crystal dropping method will be explained with reference to the attached drawings.

FIGS. 1A to 1D illustrate expanded perspective views showing a method for fabricating an LCD panel by using a related art liquid crystal dropping method.

Referring to FIG. 1A, a lower substrate 1 and an upper substrate 3 are prepared for the process. A plurality of gate lines and data lines (both not shown) are formed on the lower substrate 1 to cross each other defining pixel regions. A thin film transistor is formed at every crossing point of the gate lines and the data lines. A pixel electrode is formed at every pixel region connected to the thin film transistor.

A black matrix is formed on the upper substrate 3 for shielding a light leakage from the gate lines, the data lines, and the thin film transistor regions. A color filter layer of red, green, and blue is formed thereon. A common electrode is formed thereon in this order. An orientation film is formed on both of the lower substrate 1 and the upper substrate 3 for an initial orientation of the liquid crystal.

In FIG. 1B, a main sealant 7 and a dummy sealant 8 are coated on the lower substrate 1, and a plurality of liquid crystal droplets 5 are positioned thereon, to form a liquid crystal layer. Then, spacers (not shown) are spread on the upper substrate 3 for maintaining a cell gap.

In the liquid crystal dropping method, the liquid crystal layer is already placed between the attached substrates before setting a sealant. Accordingly, if a thermo-hardening sealant is used to bond the substrates, it may flow and contaminate the liquid crystal during the heating process. Thus, a UV sealant has to be used as a sealant to avoid such a problem.

Referring to FIG. 1C, the lower substrate 1 and the upper substrate 3 are attached to each other. As shown in FIG. 1D, a UV ray is irradiated by using a UV irradiating device 9 to harden the sealant 7 (shown in FIG. 1B), thereby bonding the lower substrate and the upper substrate 3.

However, the sealant 7 is not hardened until the UV ray is irradiated thereon. Therefore, the sealant 7 may be deformed when the external force is applied onto the lower substrate 1 and the upper substrate 2 during the process of bonding the lower substrate 1 and the upper substrate 2.

SUMMARY OF THE INVENTION

Accordingly, the present invention is directed to a liquid crystal display panel and a method for fabricating the same that substantially obviates one or more of problems due to limitations and disadvantages of the related art.

Another object of the present invention is to prevent a liquid crystal display panel from deformation of the sealant pattern during a bonding process.

Another object of the present invention is to provide a method for fabricating a liquid crystal display panel without deformation of a sealant pattern.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel includes a main UV sealant on a substrate, a first dummy UV sealant outside the main UV sealant, and a second dummy UV sealant outside the first dummy UV sealant.

In another aspect of the present invention, a method for fabricating a liquid crystal display panel includes forming a main UV sealant surrounding at least one unit cell, a first dummy UV sealant outside the main UV sealant, and a second dummy UV sealant on one of the first and second substrates outside the first dummy UV sealant, dropping a liquid crystal on one of the first and second substrates, attaching the first and second substrates, and irradiating a UV ray to the attached first and second substrates.

The main UV sealant prevents the liquid crystal from leaking and bonds the lower and upper substrates. The dummy UV sealant formed at the dummy region to be removed in the cell cutting step serves for protecting the main UV sealant and maintains a uniform cell gap between the pixel region and the main UV sealant.

That is, in the present invention, by forming a dual dummy UV sealant for protecting the main UV sealant, deformation of the main UV sealant is prevented.

The first dummy UV sealant near to the main UV sealant is formed in a closed line. The second dummy UV sealant outside the first dummy UV sealant may be formed in a discontinued straight line, such as a ']' shape at the outside of each corner of the first dummy UV sealant. Alternatively, it may be formed in a closed line.

In a further aspect of the present invention, a liquid crystal display panel includes first and second substrates, a plurality of thin film transistors and pixel electrodes on the first substrate, a black matrix and a color filter layer on the first substrate, a plurality of spacers between the first and second substrates, a main UV sealant surrounding at least one unit cell between the first and second substrates, a first dummy UV sealant surrounding the main UV sealant, a second dummy UV sealant outside the first dummy UV sealant, and a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1A:
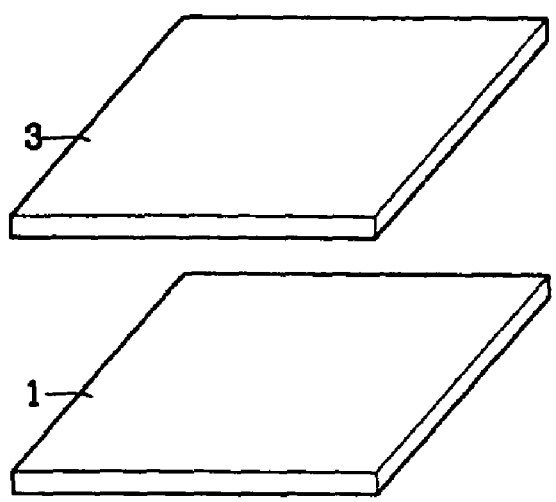
FIGS. 1A to 1D illustrate perspective views showing a method for fabricating a liquid crystal display panel by using a related art liquid crystal dropping method.
Figure 1B:
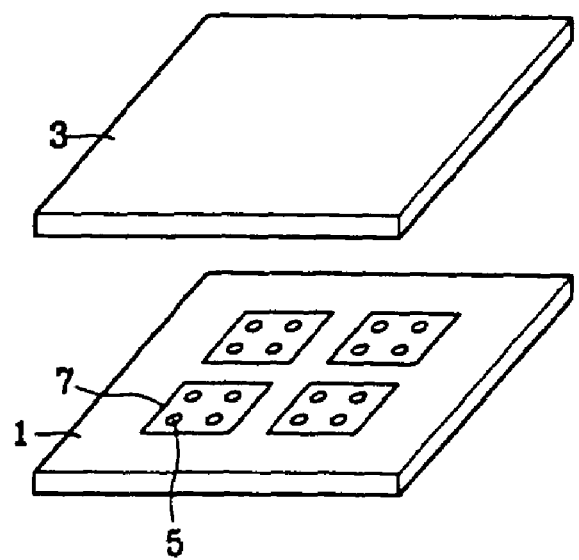
Figure 1C:
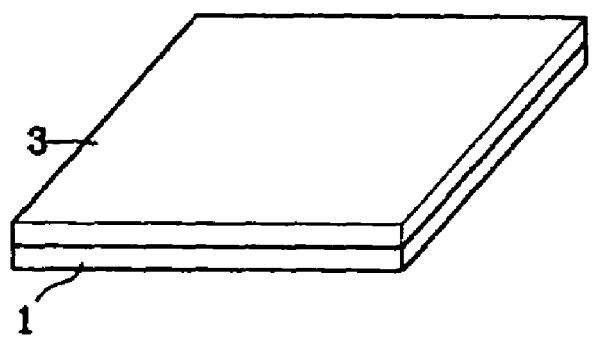
Figure 1D:
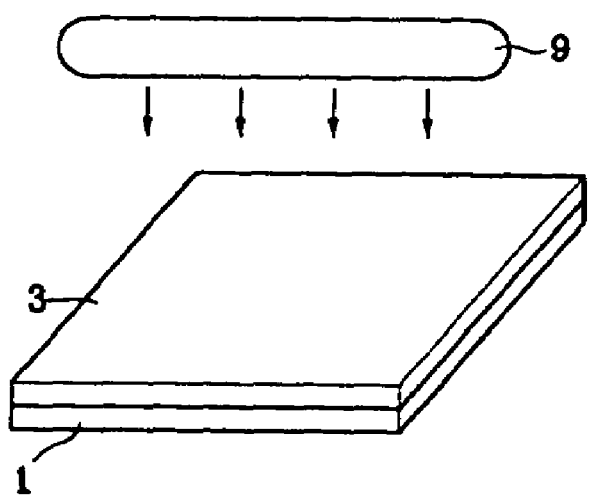
Figure 2A:
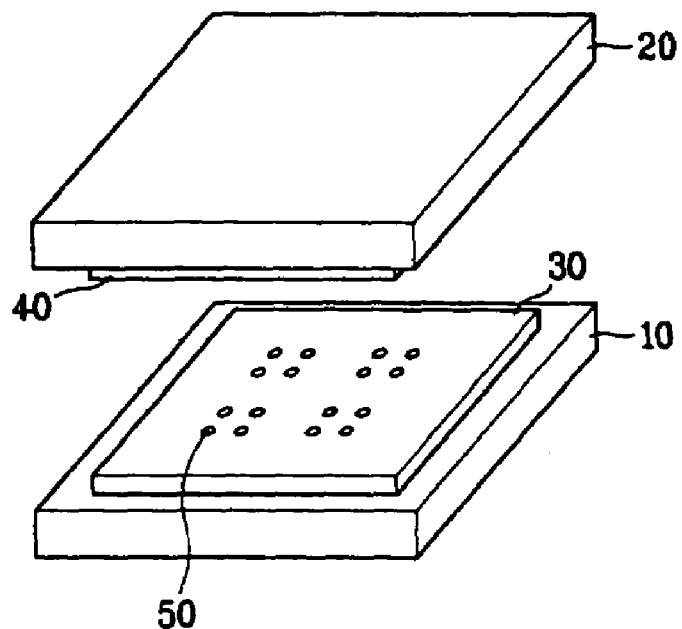
FIGS. 2A to 2C illustrate perspective views showing a bonding method in accordance with a first embodiment of the present invention.
Figure 2B:
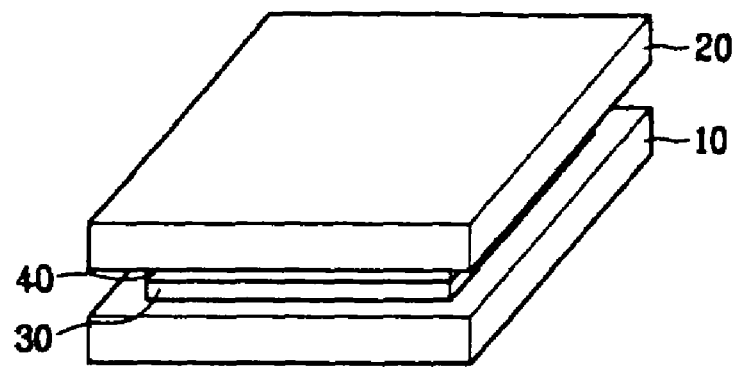
Figure 2C:
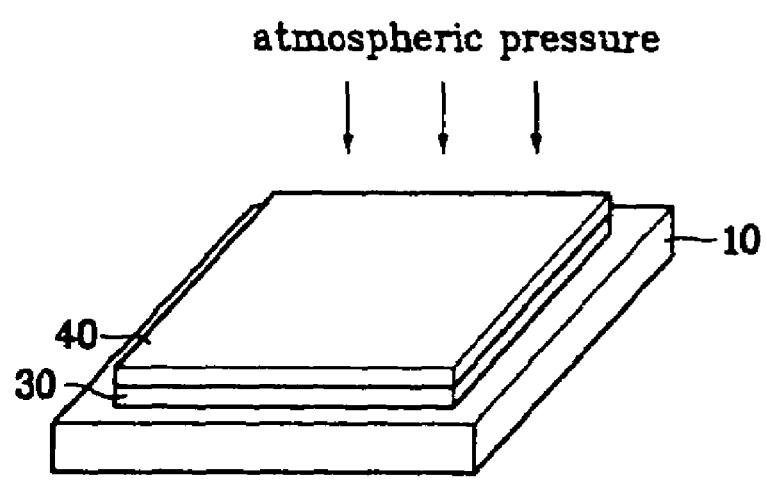

FIGS. 2A to 2C illustrate perspective views showing a bonding method in accordance with a first embodiment of the present invention.

Referring to FIG. 2A, a lower substrate 30 having a liquid crystal 50 formed thereon is loaded on a lower bonding stage 10, and an upper substrate 40 is loaded on an upper pre-bonding stage 20 such that the surface of the upper substrate 40 having the liquid crystal formed thereon faces into the lower substrate 30.

Then, referring to FIG. 2B, the lower substrate 30 and the upper substrate 40 are attached under vacuum, and the vacuum is released to apply the atmospheric pressure thereto, thereby completing the attaching process.

Since the attached substrates in the above process have a substantial weight due to the liquid crystal, it will be difficult to move the attached substrates to the later process step by using a vacuum gripping method.

Figure 3A:
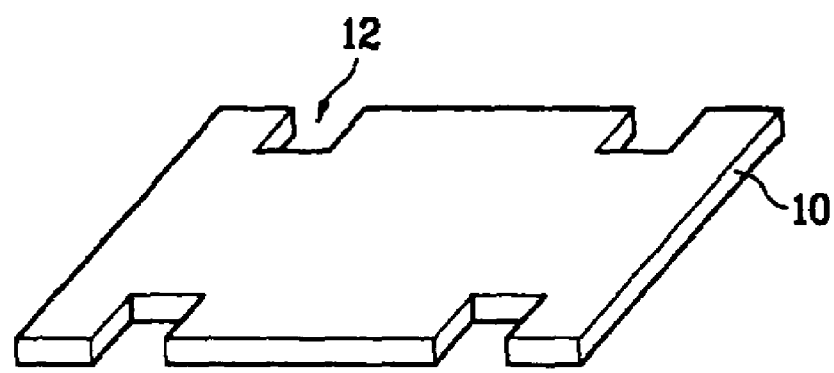
FIG. 3A illustrates a perspective view of a lower bonding stage in accordance with the first embodiment of the present invention.

Consequently, as shown in FIG. 3A, in order to unload the attached substrates from the alignment device, the lower bonding stage 10 has holes 12, and a lifter (not shown) is placed under the lower bonding stage 10. The lifter is capable of moving in up and down directions of the lower bonding stage 10 through the holes 12.

Accordingly, upon completion of the attaching process, the lifter moves up through the holes 12 to lift the attached substrates over the lower bonding stage 10 leaving a gap between the attached substrates and the lower bonding stage 10, through which robot arms move in and lift the attached substrates and transfer the attached substrates to a UV irradiating device.

Figure 3B:
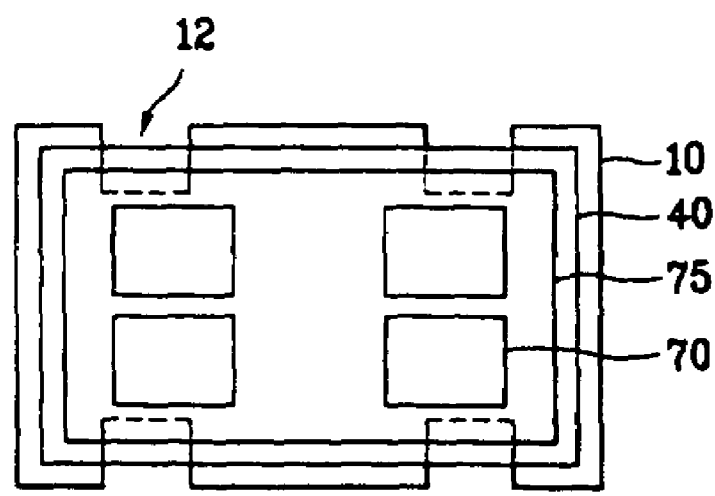
FIG. 3B illustrates an upper substrate placed on the lower bonding stage in FIG. 3A.

FIG. 3B illustrates a plane view of the attached substrates placed on the lower bonding stage 10 having the holes 12. Especially, a main UV sealant 70 and a dummy UV sealant 75 are formed on the upper substrate 40 that is placed on the lower bonding stage 10. A part of the dummy sealant 75 on the upper substrate 40 is located over the holes 12 in the lower bonding stage 10.

Consequently, bonding of the dummy sealant 75 over the holes 12 becomes poor, and results in deformation of the main sealant 70 pattern at the inside of the dummy sealant 75 that is not bonded perfectly. This is because air infiltrates through the deformed sealant when the vacuum is released to apply the atmospheric pressure to the attached substrates for bonding the substrates during the attaching process. Therefore, the present invention suggests forming a dual dummy UV sealant outside the main UV sealant to eliminate the foregoing problem.

Figure 4A:
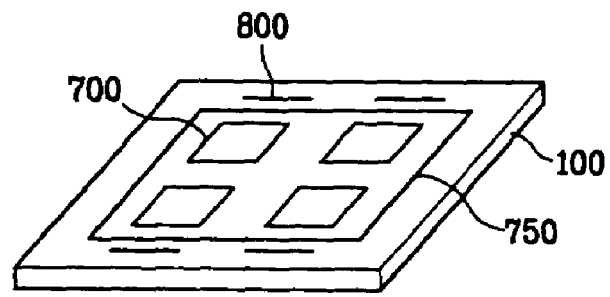
FIGS. 4A to 4C illustrate perspective views of a substrate for a liquid crystal display panel in accordance with the first embodiment of the present invention.
Figure 4B:
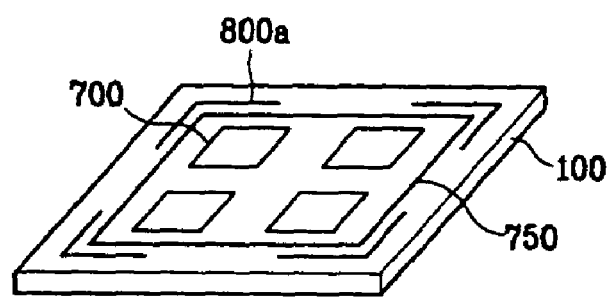
Figure 4C:
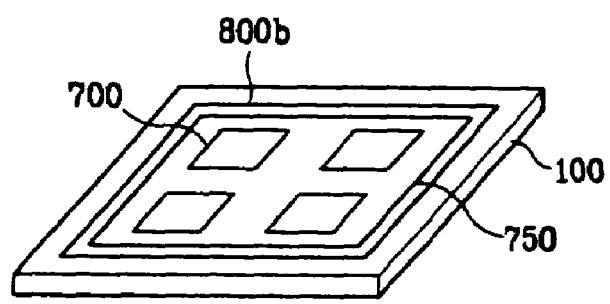

FIGS. 4A to 4C illustrate perspective views of a substrate for a liquid crystal display panel in accordance with the first embodiment of the present invention. As an example, four unit cells are illustrated on the mother substrate in the drawings. However, the number of unit cells may be varied.

Referring to FIGS. 4A to 4C, there are a main UV sealant 700 formed on a substrate 100 in a closed line without an injection hole, and a first dummy UV sealant 750 formed at the dummy region in the outside of the main UV sealant 700 in a closed line without an injection hole. Also, there may be a second dummy UV sealant 800, 800a, or 800b at the outside of the first dummy UV sealant 750.

As shown in FIG. 4A, the second dummy UV sealant 800 covers at least the area of the lift pin holes of the attaching device, which may be formed in discontinued straight lines at the outside of one side of the first dummy UV sealant 750.

In general, since the lift pin holes of the attaching device is formed at the longer sides of the substrate for lifting the substrate to prevent bending of the substrate, the second dummy UV sealant 800 will be formed at the outside of the longer side of the corners at the first dummy UV sealant 750.

In the meantime, as shown in FIG. 4A, the second dummy UV sealant 800 is formed in discontinued straight lines on one side of the corner of the first dummy UV sealant 750. In this embodiment, there may be a possibility that air infiltrates through the other side of the corner where no second dummy UV sealant is formed, thereby deforming the main UV sealant 700.

As shown in FIG. 4B, the second dummy UV sealant 800*a* is formed in a ']' form as an example at the outside of both sides of the corners of the first dummy UV sealant 750. The specific shape of the second dummy UV sealant 800*a* is not required as long as it covers each corner of the outside of the first dummy UV sealant 750.

Referring to FIG. 4C, the dummy UV sealant 800*b* may also be formed at the outside of the first dummy UV sealant 750 in a single closed continued line.

The main, first, and second dummy UV sealants 700, 750, 800, 800*a*, and 800*b* are formed of one of monomer and oligomer having both ends coupled with an acryl group mixed with an initiator. Alternatively, one of monomer and oligomer has one end coupled with an acryl group and the other end coupled with an epoxy group mixed with an initiator.

The liquid crystal display panel includes a lower substrate, an upper substrate, and a liquid crystal between the two substrates. A sealant may be formed on either one of the substrates.

When the substrate of the LCD shown in one of FIGS. 4A to 4C is a lower substrate, the substrate 100 has a plurality of gate lines, data lines, thin film transistors, and pixel electrodes. When the substrate is an upper substrate, the substrate 100 has a black matrix, a color filter layer, and a common electrode.

Moreover, a plurality of column spacers may be formed on one of the substrates for maintaining a cell gap. The column spacers may be formed at the region opposite to the region of the gate lines or the data lines. For example, the column spacers may be formed of photosensitive organic resin.

FIGS. 5A to 5E illustrate perspective views of a method for fabricating a liquid crystal display panel in accordance with the first embodiment of the present invention. As an example, four unit cells are shown in the drawings. However, the number of unit cells may be varied.

Figure 5A:
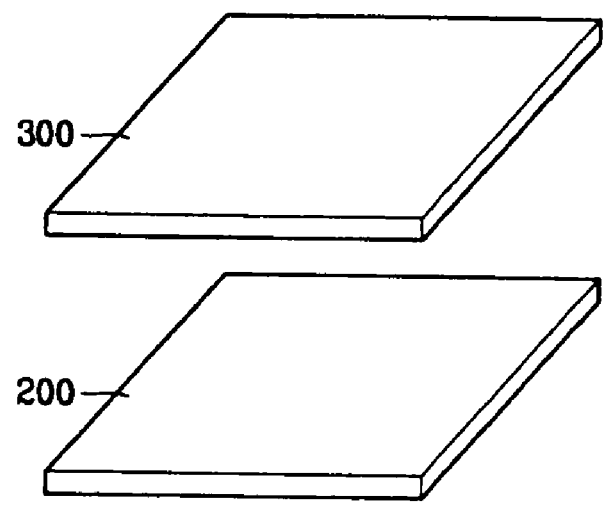
FIGS. 5A to 5E illustrate perspective views of a method for fabricating a liquid crystal display panel in accordance with the first embodiment of the present invention.

Referring to FIG. 5A, a lower substrate 200 and an upper substrate 300 are prepared for further processes. A plurality of gate lines and data lines (both not shown) are formed on the lower substrate 200 to cross one another defining a plurality of pixel regions, a thin film transistor having a gate electrode, a gate insulating film, a semiconductor layer, an ohmic contact layer, and source/drain electrodes. A protection layer is formed at each crossed points of the gate lines and the data lines. A plurality of pixel electrodes are formed to be connected to the thin film transistors at the pixel regions.

An orientation film is formed on the pixel electrodes for an initial orientation of the liquid crystal. The orientation film may be formed of one of polyamide or polyimide group compound, polyvinylalcohol (PVA), and polyamic acid by rubbing orientation. Alternatively, a photosensitive material, such as polyvinvylcinnamate (PVCN), polysilioxanecinnamate (PSCN), and cellulosecinnamate (CelCN) group compound may be selected for the orientation film by using photo orientation.

A black matrix is formed on the upper substrate 300 for shielding the light leakage from the gate lines, the data lines, and regions of the thin film transistor regions. A color filter layer of red, green, and blue is formed thereon. A common electrode is formed on the color filter layer. An overcoat layer may be formed between the color filter layer and the common electrode, additionally. The orientation film is formed on the common electrode.

Silver (Ag) dots are formed on the outer periphery of the lower substrate 200 for applying a voltage to the common electrode on the upper substrate 300 after the two substrates 200 and 300 are attached to each other. The silver dots may be formed on the upper substrate 300.

In an in-plane switching (IPS) mode LCD, a lateral field is induced by the common electrode formed on the lower substrate. The pixel electrode is also formed on the lower substrate, and the silver dots are not formed.

Figure 5B:
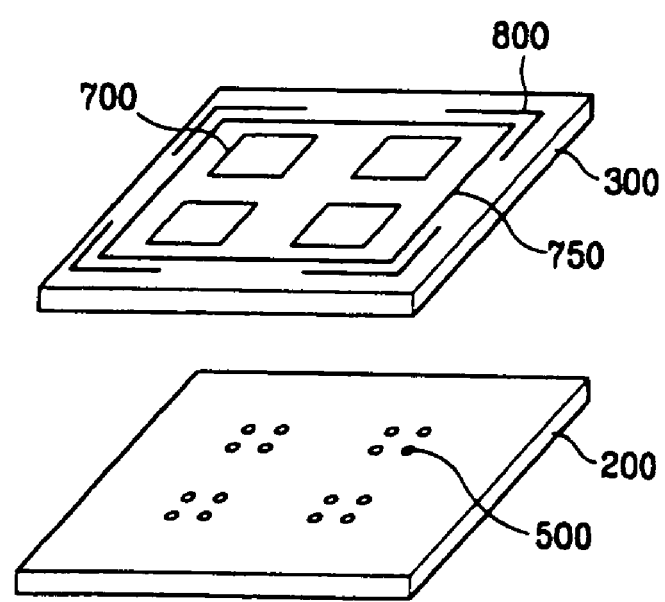

Referring to FIG. 5B, a main UV sealant 700 is coated on the upper substrate 300 in a closed line. A first dummy UV sealant 750 is also formed in a closed line at the dummy region outside of the main UV sealant 700.

Although FIG. 5B illustrates that the second dummy UV sealant 800 is formed at the outside of each corner of the first dummy UV sealant 750 in a ']' form, the second dummy UV sealant 800 may be formed at the outside of one side of the first dummy UV sealant 750 in a discontinued straight line. Alternatively, it may also be formed at the outside of the first dummy UV sealant 750 in a continued closed line. Detailed patterns of the foregoing second dummy UV sealant 800 are similar to those of FIGS. 4A to 4C.

The sealant may be formed by using one of screen printing and dispensing method. When the sealant is coated by the screen printing method, it may damage the orientation film formed on the substrate. This is because the screen comes into contact with the substrate. In addition, it is not economically feasible because a large amount of the sealant may be wasted in the screen printing method when the substrate is large.

The main, first, and second dummy UV sealant 700, 750, and 800 are formed of one of monomer and oligomer having both ends coupled with an acryl group mixed with an initiator. Alternatively, one of monomer and oligomer has one end coupled with an acryl group and the other end coupled with an epoxy group mixed with an initiator.

A liquid crystal 500 is then dropped onto the lower substrate 200 to form the liquid crystal layer.

The liquid crystal 500 may be contaminated when the liquid crystal contacts the main sealant 700 before the main sealant 700 is hardened. Therefore, the liquid crystal may have to be dropped onto the central part of the lower substrate 200 to avoid this problem. The liquid crystal 500 dropped onto the central part spreads slowly even after the main sealant 700 is hardened, so that the liquid crystal is distributed throughout the entire substrate with the same concentration.

The drawing illustrates that the liquid crystal 500 is dropped and the sealants 700, 750, and 800 are formed on the lower substrate 200. However, the liquid crystal 500 may be formed on the upper substrate 300, and the UV sealant 700, 750, and 800 may be coated on the lower substrate 200.

Moreover, the liquid crystal 500 and the UV sealant 700, 750, and 800 may be formed on the same substrate. However, when the liquid crystal and the sealants are formed on different substrates, a fabrication time may be shortened. When the liquid crystal and the sealants are formed on the same substrate, there occurs an unbalance in processes between the substrate having the liquid crystal and the sealant and the substrate without the liquid crystal and the sealant. As a result, the substrate cannot be cleaned when the sealant is contaminated even before attaching the substrates.

Therefore, after the UV sealants 700, 750, and 800 are coated on the upper substrate 300, a cleaning process may be added for cleaning the upper substrate 300 before the attaching process.

Moreover, a plurality of spacers (not shown) may be formed on either of the two substrates 200 or 300 for maintaining a cell gap. A plurality of ball spacers mixed with a solution at an appropriate concentration may be sprayed at a high pressure onto the substrate from a spray nozzle. Alternatively, a plurality of column spacers may be formed on the substrate opposite to the regions of the gate lines or data lines. The column spacers may be used for the large sized substrate since the ball spacers may form an uneven cell gap in the large sized substrate. The column spacers may be formed of photosensitive organic resin.

Figure 5C:
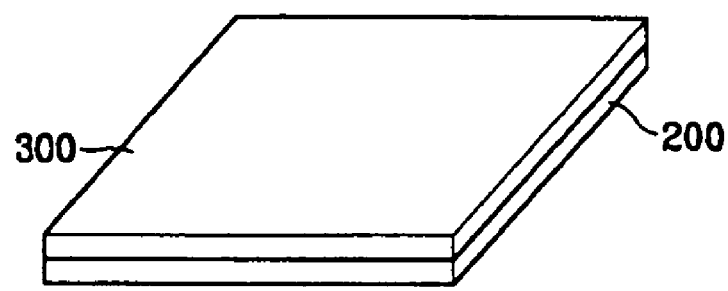

Referring to FIG. 5C, the lower substrate 200 and the upper substrate 300 are attached to each other. The lower substrate 200 and the upper substrate 300 may be attached, by placing the lower substrate 200 with the dropped liquid crystal on the lower part, rotating the upper substrate 300 by 180 degrees such that the side of the upper substrate having the liquid crystal faces into the upper surface of the lower substrate 200, and pressing the upper substrate 300, or by evacuating the space between the two substrates 200 and 300 into vacuum and releasing the vacuum, thereby attaching the two substrates 200 and 300.

Figure 5D:
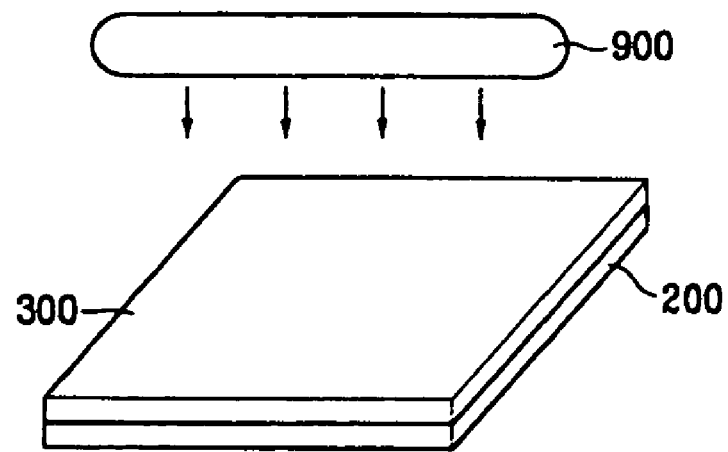
Figure 5E:
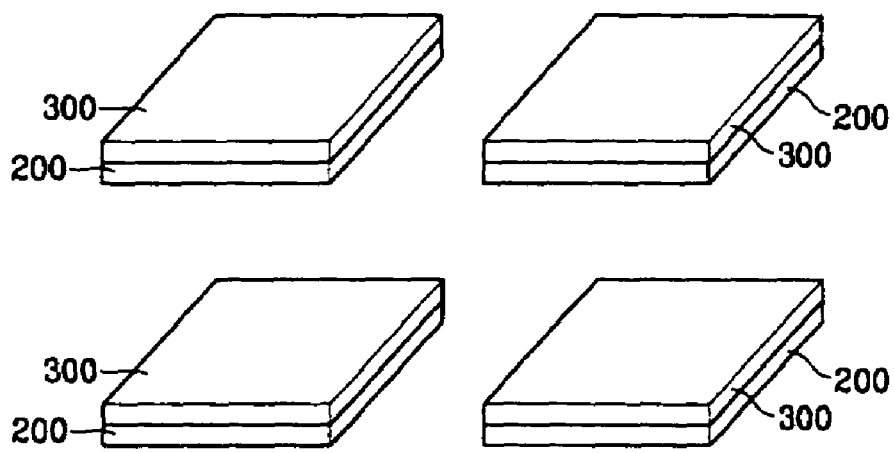

Referring to FIG. 5D, a UV ray is irradiated to the attached substrates 200 and 300 by using a UV irradiating device 900. Upon irradiation of the UV ray thereto, one of monomer and oligomer in the UV sealants 700, 750, and 800 activated by an initiator is polymerized and hardened, thereby bonding the lower substrate 200 and the upper substrate 300.

When monomer or oligomer each having one end coupled with an acrylic group and the other end coupled with an epoxy group mixed with an initiator is used as the UV sealant 700, 750, and 800, the epoxy group is not reactive with the UV ray. Thus, the sealant has to be heated at about 120° C. for one hour in addition to the UV ray irradiation for hardening the sealant.

In the UV irradiation, if the UV ray is irradiated onto the entire surface of the bonded substrates, the UV ray may affect the device characteristics of the thin film transistors, and the like on the substrates. As a result, a pretilt angle of the orientation film for the initial orientation of the liquid crystal may be changed due to the UV irradiation.

Figure 6:
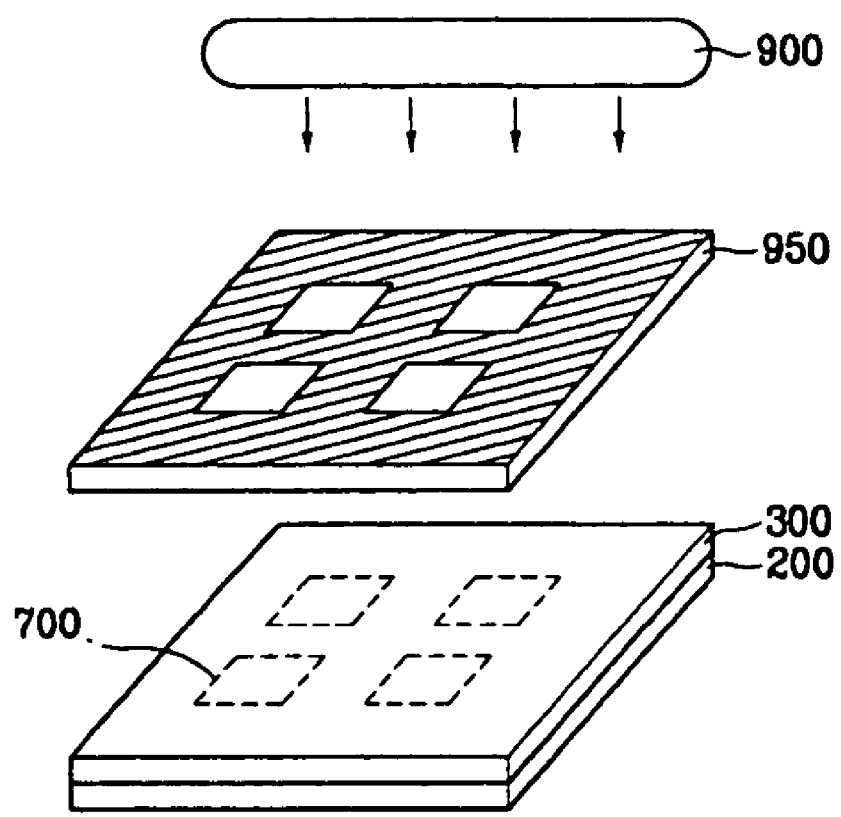
FIG. 6 is a perspective view to illustrate a UV irradiation process in a method for fabricating a liquid crystal display panel in accordance with a second embodiment of the present invention.

Therefore, as shown in FIG. 6, the UV ray is irradiated with a mask 950 placed between the bonded substrates 200 and 300 and the UV irradiating device 900 for masking the active region in the main UV sealant 700.

Referring back to FIG. 5E, the bonded substrates are cut into a plurality of unit cells after the UV irradiation. After scribing the surface of the bonded substrates by a scriber, such as a diamond pen having a hardness higher than glass, a material of the substrates (scribing process), a mechanical impact is given along the scribing line (breaking process), thereby obtaining a plurality of unit cells. Alternatively, a cutting apparatus having a toothed wheel may be used to carry out the scribing process and the breaking process at the same time.

When the cutting apparatus is used for cutting and breaking at the same time, an equipment space and a cutting time period may be reduced.

The scribing lines (not shown) for cutting the cells are formed between the main UV sealant 700 and the first dummy UV sealant 750. Therefore, after the cell cutting process, the unit cell has no first and second dummy UV sealants 750 and 800.

A final inspection (not shown) is carried out after the cell cutting process. The final inspection determines whether there are defects before the substrates cut into the unit cells are assembled for a module. The examination is performed by operating pixels with an applied voltage thereto.

Figure 7:
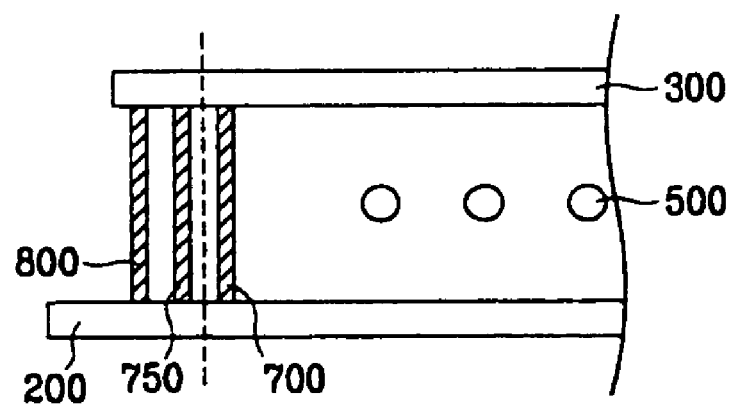
FIG. 7 illustrates a partial cross-sectional view of a liquid crystal display panel in accordance with the first embodiment of the present invention.

FIG. 7 is a partial cross-sectional view of an LCD panel in accordance with the first embodiment of the present invention, illustrating a part of the LCD panel before the cell cutting process.

In FIG. 7, the LCD panel includes a lower substrate 200 and an upper substrate 300, arranged to be spaced apart from each other.

The lower substrate 200 has a plurality of gate lines, data lines, thin film transistors, and pixel electrodes. The upper substrate 300 has a black matrix, a color filter layer, and a common electrode. An IPS mode LCD panel has the common electrode formed on the lower substrate 200.

There are a plurality of spacers between the two substrates 200 and 300 for maintaining a cell gap. The spacers may be ball spacers spread on the substrate, or column spacers formed on the substrate. The column spacers may be formed on the upper substrate 300.

There are a main UV sealant 700 in a closed line between the two substrates 200 and 300, a first dummy UV sealant 750 in a closed line at the outside of the main UV sealant 700, and a second dummy UV sealant 800 at the outside of the first dummy UV sealant 750.

As explained, the second dummy UV sealant may have different patterns.

There is a liquid crystal layer 500 within the boundary of the main UV sealant 700 between the two substrates 200 and 300.

As has been explained, the LCD panel and the method for fabricating the same of the present invention have the following advantage.

A dual dummy UV sealant provided for protecting the main UV sealant prevents deformation of the main UV sealant.

It will be apparent to those skilled in the art that various modifications and variations can be made in the liquid crystal display panel and the method for fabricating the same of the present invention without departing from the spirit or scope of the inventions. Thus, it is intended that the present invention covers the modifications and variations of this invention provided they come within the scope of the appended claims and their equivalents.

What is claimed is:

1. A method for fabricating a liquid crystal display panel, comprising:
    forming at least one main UV sealant surrounding at least one unit cell, a first dummy UV sealant enclosing the at least one main UV sealant, and a second dummy UV sealant on one of first and second substrates outside the first dummy UV sealant;
    dropping a liquid crystal on one of the first and second substrates;
    attaching the first and second substrates;
    lifting up the attached first and second substrates using a lifter, wherein the second dummy UV sealant is located outside the first dummy UV sealant to cover an area where the lifter touches the attached first and second substrates;
    transferring the attached first and second substrates to a UV irradiating device; and irradiating a UV light to the attached first and second substrates.

2. The method of claim 1, wherein the second dummy UV sealant is formed to have a length at least the same as each lift pin hole width of a substrate stage.

3. The method of claim 1, wherein the second dummy UV sealant is formed as a plurality of discontinued lines to surround each corner outside the first dummy UV sealant.

4. The method of claim 1, wherein the second dummy UV sealant is formed as a closed line.

5. The method of claim 1, wherein bonding the substrates includes masking an active region within a boundary of the main UV sealant.

6. The method of claim 1, further comprising heating the attached first and second substrates after irradiating a UV light.

7. The method of claim 1, further comprising cleaning the first and second substrates after forming a main UV sealant, a first dummy UV sealant, and a second dummy UV sealant on one of the substrates.

8. The method of claim 1, further comprising cutting the attached first and second substrates into a plurality of unit cells after irradiating a UV light.

9. The method of claim 1, wherein the UV sealants are formed on the first substrate, and the liquid crystal is dropped on the second substrate.

10. The method of claim 1, wherein the liquid crystal is dropped on one of the first and second substrates different from the substrate on which the main UV sealant and the first and second dummy UV sealants are formed.

* * * * *